United States Patent
Long (10) Patent No.: US 8,369,314 B2
(45) Date of Patent: *Feb. 5, 2013

(54) CALL CONTROL METHOD AND IMS CS CONTROL APPARATUS

(75) Inventor: Shuiping Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 669 days.

This patent is subject to a terminal disclaimer.

(21) Appl. No.: 12/465,984

(22) Filed: May 14, 2009

(65) Prior Publication Data

US 2009/0219926 A1 Sep. 3, 2009

Related U.S. Application Data (63) Continuation of application No. PCT/CN2008/071286, filed on Jun. 13, 2008.

(51) Int. Cl.
H04L 12/66 (2006.01)

(52) U.S. Cl. ........................................ 370/352

(58) Field of Classification Search .................. None
See application file for complete search history.

(56) References Cited

U.S. PATENT DOCUMENTS

| 2007/0058789 | A1 | 3/2007 | Lim et al. | |
| 2007/0121608 | A1 | 5/2007 | Gu et al. | |
| 2007/0195802 | A1* | 8/2007 | Kallio et al. | 370/401 |
| 2008/0049725 | A1* | 2/2008 | Rasanen | 370/352 |

FOREIGN PATENT DOCUMENTS

| CN | 1756242 | | 4/2006 |
| CN | 1893427 | A | 1/2007 |
| CN | 1949752 | | 4/2007 |
| CN | 1972254 | | 5/2007 |
| EP | 1750400 | A1 | 2/2007 |
| WO | WO 2006/034658 | A1 | 4/2006 |

OTHER PUBLICATIONS

3GPP Tr 23.892 v1.0.0 (Jun. 2007).*
Extended European Search Report dated (mailed) May 18, 2010, issued in related Application No. 08757697.1-2413 / 2073482, PCT/CN2008071286, filed Jun. 13, 2008, Hauwei Technologies Co., Ltd.
3GPP TSG Services and System Aspects: "Potential Mechanisms for CS Domain Video and Voice Service Improements (Release 6)", 3rd Generation Partnership Project (3GPP); Technical Report (TR); [60156], vol. 23.801, No. V1.0.0, Jun. 1, 2004, XP002477268.

(Continued)

*Primary Examiner* — Yong Zhou
(74) *Attorney, Agent, or Firm* — Conely Rose, P.C.; Grant Rodolph; Rayhao Chung (57) ABSTRACT

A call control method and an IP multimedia subsystem (IMS) circuit-switched (CS) control apparatus are disclosed. The call control method includes these steps: a terminal device and a second party set up a call through a CS call leg set up between the terminal device and an IMS CS control function (ICCF) and a second call leg set up between the ICCF and the second party; and the ICCF receives a media type change request, and rejects the change of media type for the call between the terminal device and the second party if more than one session is available on the terminal device. Embodiments of the present invention avoid call failure upon session transfer due to the change of media type in the prior art, thus improving the reliability and stability of session transfer.

12 Claims, 9 Drawing Sheets

OTHER PUBLICATIONS

3GPP SA WG2: "$3^{rd}$ Generation Partnership Project; technical specification Group Services and System Aspects; IP Multimedia System (IMS) centralized services (Release 8), 3GPP TR 23.892 V1.0.0" 3GPP Specifications, vol. 23.892, No. V1.0.0, Jun. 1, 2007, XP002503210.

Written Opinion of the International Searching Authority (translation) dated (mailed) Oct. 2, 2008, issued in related Application No. PCT/CN2008/071286, filed Jun. 13, 2008, Huawei Technologies Co., Ltd.

* cited by examiner

FIG. 11

CALL CONTROL METHOD AND IMS CS CONTROL APPARATUS

CROSS-REFERENCE TO RELATED APPLICATIONS

This application is a continuation of International Application No. PCT/CN2008/071286, filed on Jun. 13, 2008, which claims the benefit of Chinese Patent Application No. 200710106735.2, filed on Jun. 15, 2007, both of which are hereby incorporated by reference in their entireties.

FIELD OF THE INVENTION

The present invention relates to an IP multimedia subsystem (IMS) centralized service (ICS) in the communication technology field, and in particular, to a call control method and an IMS circuit-switched (CS) control apparatus.

BACKGROUND OF THE INVENTION

Currently, most of mobile communication networks are CS networks, such as the global system for mobile communications (GSM) and code division multiple access (CDMA) network. Operators establish perfect and rich service platforms based on the CS network, of which a mobile switching center (MSC) is responsible for call routing and service logic execution, for example, call forwarding service and call hold service.

The CS network needs supports from MSCs in visited locations to provide services, making it difficult to launch new services. The IMS is a packet-switched (PS)-based service network, and can provide services without supports from visited locations, making it convenient to launch new multimedia services. The IMS supports user equipment (UE) in connecting to an IMS network through various PS access networks, for example, general packet radio service (GPRS), to implement IMS multimedia services.

The PS-based IMS network represents the future development trend of communication networks. However, the IMS network is so complex that it cannot be deployed completely in a short term. In addition, CS network users may not replace traditional terminals with new IMS terminals within a short time. Thus, the CS network may coexist with the IMS network in the coming years. The CS network and the IMS network need to be operated at the same time.

During the evolution of the CS network to the IMS network, the Third Generation Partnership Project (3GPP) proposes ICS, requiring the UE to set up an IMS call by carrying voice or video phone (VP) media over the CS network, so as to weaken or remove the service processing logic of the MSC. The UE receives or transmits IMS call related control signalling through a new IMS CS control channel (ICCC). The ICCC may be set up over unstructured supplementary service data (USSD) and called ICCC-cs, or set up over PS and called ICCC-ps.

Figure 1:
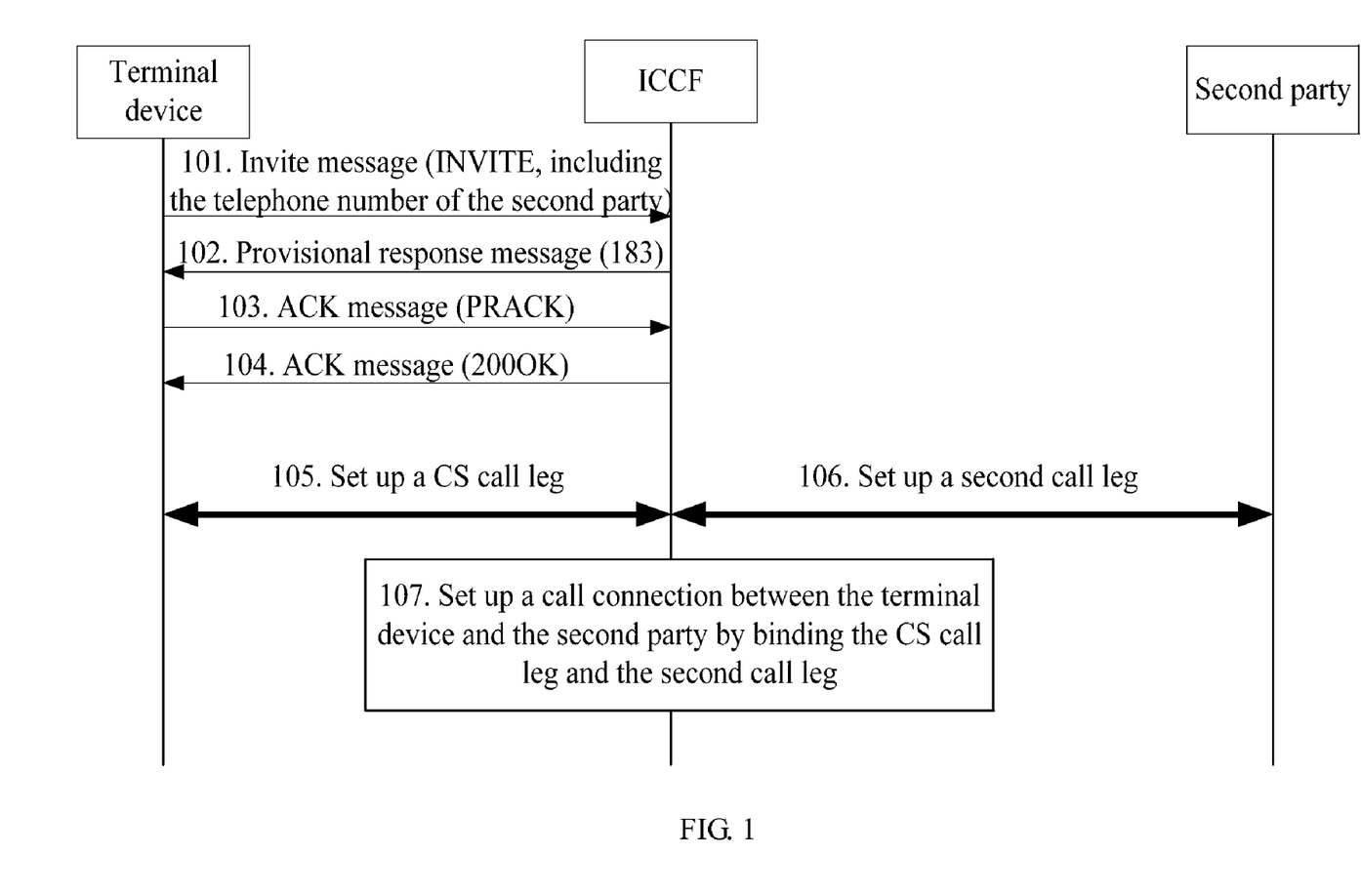
FIG. 1 shows a calling process of setting up an ICS call through a CS network in the prior art.

A calling process of setting up an ICS call through a CS network in the prior art includes the following steps:

Steps 101-104: A terminal device sets up an ICCC with an IMS CS control function (ICCF), and sends the telephone number of a called party to the ICCF through the ICCC. The details are as follows:

Step 101: The terminal device sends an INVITE message to the ICCF, where the INVITE message includes the telephone number of the called party. The INVITE message may be transmitted through the USSD or PS network.

It is understandable that the PS network may be a packet access network such as GPRS, but the specific transmission mode may be selected according to the network services that are available to the user terminal.

Step 102: The ICCF returns a provisional response message (183), where the provisional response message may include the ICCF number. The ICCF number may also be pre-configured in the terminal device. In this case, the ICCF number does not need to be returned.

Step 103: The terminal device sends a provisional response acknowledgement message (PRACK) to the ICCF.

Step 104: The ICCF returns a 200OK message to acknowledge the receipt of the PRACK message.

Step 105: The terminal device and the ICCF set up a CS call leg.

Step 106: The ICCF and the called party set up a second call leg.

Step 107: The ICCF sets up a call connection between the terminal device and the second party by binding the call leg set up between the ICCF and the terminal device and the second call leg set up between the ICCF and the second party.

The ICCF may be regarded as a back-to-back-user-agent (B2BUA), which is equivalent to two user agents (UAs) that are bound. The first call leg set up between the ICCF and the terminal device and the second call leg set up between the ICCF and the called party are mutually independent. When one call leg is removed, the other call leg may exist. The setup of the first call leg and the second call leg may be triggered by each other. During the setup, the signalling interaction, media connection, and call connection are implemented between the terminal device and the second party.

The called process of setting up an IMS call through a CS network in IMS CS mode is similar to the calling process, and will not be further described.

On the basis of the above basic calling process in the prior art, the terminal device may send a request for setting up a session with a third party to the ICCF through the ICCC. After setting up the call leg with the third party, the ICCF may set up a call connection between the terminal device and the third party by binding the CS call leg and the third call leg.

In addition, the ICCF may transfer sessions between the terminal device and the second party and between the terminal device and the third party by receiving control signalling and reusing the CS call leg.

During the research and practice of the prior art, the inventor discovers the following problems:

The above technical solution may set up an IMS call through the CS network, and transfer sessions between the terminal device and the second party and between the terminal device and the third party. However, if the media type for the call is changed during the call, the call may be disconnected due to the change of the media type after session transfer. For example, in the above technical solution, if the media type for the call between the terminal device and the second party is changed, the media type for the CS call leg set up between the terminal device and the ICCF is different from the media type for the third call leg set up between the ICCF and the third party after session transfer. This may disconnect the call between the terminal device and the third party.

SUMMARY OF THE INVENTION

Embodiments of the present invention provide a call control method and an IMS CS control apparatus to ensure the reliability of session transfer during an ICS call set up through a CS network.

A call control method provided in an embodiment of the present invention includes:

controlling, by an IP multimedia subsystem (IMS) circuit-switched control function (ICCF), a call between a terminal device and a second party through a CS call leg that is set up between the ICCF and the terminal device and a second call leg that is set up between the ICCF and the second party; and receiving, by the ICCF, a media type change request, and rejecting the change of media type for the call between the terminal device and the second party if: more than one session is available on the terminal device or a CS network where the terminal device is located does not support service change and service change and UDI fallback (SCUDIF).

A call control method provided in an embodiment of the present invention includes:

controlling, by an IP multimedia subsystem (IMS) circuit-switched control function (ICCF), a call between a terminal device and a second party through a CS call leg set up between the ICCF and the terminal device and a second call leg set up between the ICCF and the second party, and holding a third call leg set up between the ICCF and a third party;

receiving, by the ICCF, a session transfer request from the terminal device;

changing, by the ICCF, the media type for the CS call leg between the terminal device and the ICCF, to a media type same as that for the third call leg; and setting up, by the ICCF, a call connection between the terminal device and the third party by binding the CS call leg for which the media type is changed and the third call leg.

An IMS CS control apparatus provided in an embodiment of the present invention includes:

a call control unit, adapted to control a call between a terminal device and a second party through a CS call leg set up between the apparatus and the terminal device and a second call leg set up between the apparatus and the second party; and a media change deciding unit, adapted to: receive a media type change request, and reject the change of media type for the call between the terminal device and the second party if more than one session is available on the terminal device.

An IMS CS control apparatus provided in an embodiment of the present invention includes:

a call control unit, adapted to control a call between a terminal device and a second party through a CS call leg set up between the apparatus and the terminal device and a second call leg set up between the apparatus and the second party; and a media change deciding unit, adapted to: receive a media type change request, and reject the change of media type for the call between the terminal device and the second party if a CS network where the terminal device is located does not support SCUDIF.

An IMS CS control apparatus provided in an embodiment of the present invention includes:

a call control unit, adapted to: control a call between a terminal device and a second party through a CS call leg set up between the apparatus and the terminal device and a second call leg set up between the apparatus and the second party, and hold a third call leg set up between the apparatus and a third party;

a session transfer unit, adapted to: receive a session transfer request from the terminal device, change the media type for the CS call leg set up between the apparatus and the terminal device to a media type same as that for the third call leg, and notify a call leg binding unit of binding the CS call leg for which the media type is changed and the third call leg; and the call leg binding unit, adapted to set up a call connection between the terminal device and the third party by binding the CS call leg for which the media type is changed and the third call leg.

In embodiments of the present invention, a terminal device sets up a call with a second party through a CS call leg set up between the terminal device and an ICCF and a second call leg set up between the ICCF and the second party; the ICCF receives a media type change request, and rejects the change of media type for the call between the terminal device and the second party if more than one session is available on the terminal device. Embodiments of the present invention avoid the call failure upon session transfer due to the change of media type, thus improving the reliability and stability of session transfer.

DETAILED DESCRIPTION OF THE EMBODIMENTS

Embodiments of the present invention provide a call control method and an IMS CS control apparatus to ensure the reliability of session transfer during an ICS call set up through a CS network. The call control method and IMS CS control apparatus provided in embodiments of the present invention are hereinafter described in detail.

Figure 2:
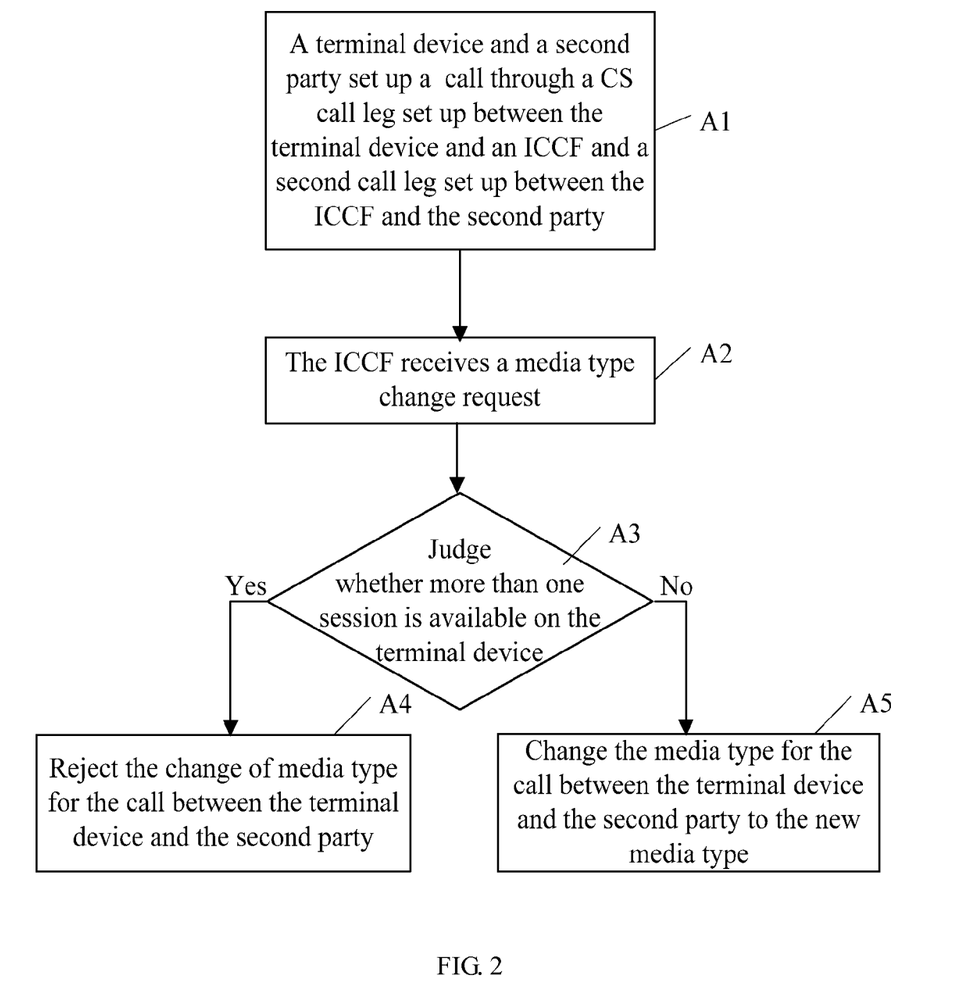
FIG. 2 is a flowchart of a call control method provided in an embodiment of the present invention.

FIG. 2 shows a call control method provided in an embodiment of the present invention. The method includes the following steps:

A1. A terminal device and a second party set up a call through a CS call leg set up between the terminal device and an ICCF and a second call leg set up between the ICCF and the second party.

In this embodiment of the present invention, the terminal device may be a network device that communicates based on CS, for example, a mobile phone, a fixed telephone, a network computer, and a server. The second party includes a peer terminal device that sets up a call with the terminal device, and an access network in which the second party is located.

The access network may be a PS or CS access network and is not limited in the present invention.

A2. The ICCF receives a media type change request.

In this embodiment of the present invention, the media type may include audio, video, and file. The media type change request that the ICCF receives is sent by the terminal device through an ICCC, and may include a new media type. The media type change request that the ICCF receives may also be sent by the second party, and include a new media type. The media type change request may be an INVITE message, a Re-INVITE message, or an UPDATE message.

It is understandable that the media type change request may not include a new media type and that a new media type may be obtained from a party that requests media change after a media type change request is received.

A3. The ICCF judges whether more than one session is available on the terminal device. If so, the process proceeds to A4; otherwise the process skips to A5.

In this embodiment of the present invention, the process of judging whether more than one session is available on the terminal device may be a process of judging whether the ICCF acts as the agent of the terminal device to set up more than one session leg with other parties, where the session refers to communications between the terminal device and a peer party.

A4. The ICCF rejects the change of media type for the call between the terminal device and the second party.

In this embodiment of the present invention, if the media type change request is sent by the terminal device, the process of rejecting the change of media type for the call between the terminal device and the second party is to return a reject message to the terminal device to reject the change of media type; if the media type change request is sent by the second party, the process of rejecting the change of media type for the call between the terminal device and the second party is to return a reject message to the second party to reject the change of media type.

A5. The ICCF changes the media type for the call between the terminal device and the second party to the new media type.

In this embodiment of the present invention, the process of changing the media type for the call between the terminal device and the second party to the new media type may be implemented in regular mode in the prior art. However, this requires the CS network devices to support SCUDIF, thus raising high requirements for the CS network devices. In fact, the CS network in the prior art does not support the change of media type during the calling process. Thus, the process of changing the media type for the call between the terminal device and the second party to the new media type may be implemented by using the following method:

releasing the CS call leg set up between the terminal device and the ICCF, which is based on the old media type;

setting up a CS call leg based on the new media type between the terminal device and the ICCF;

changing the media type for the second call leg to the new media type; and by the ICCF, setting up a call connection between the terminal device and the second party by binding the CS call leg based on the new media type and the second call leg that uses the new media type.

In the prior art, only CS protocols of Release 5 or later versions can support SCUDIF; that is, the media type may be changed without hanging up a call. Release 4, Release 99 and GSM do not support SCUDIF. Thus, the above method re-sets up a call leg on the CS network. Compared with the method in the prior art, this method lowers the requirements for the CS network, and does not require the CS network to support SCUDIF. As a result, it is unnecessary to upgrade the CS network devices on a large scale, thus reducing network construction costs and enhancing the universality.

In this embodiment of the present invention, the terminal device sets up a call with the second party through a CS call leg set up between the terminal device and the ICCF and a second call leg set up between the ICCF and the second party; the ICCF receives a media type change request, judges whether more than one session is available on the terminal device, and rejects the change of media type for the call between the terminal device and the second party if more than one session is available on the terminal device. This embodiment of the present invention avoids the call failure upon session transfer due to the change of media type, thus improving the reliability and stability of session transfer.

Figure 3:
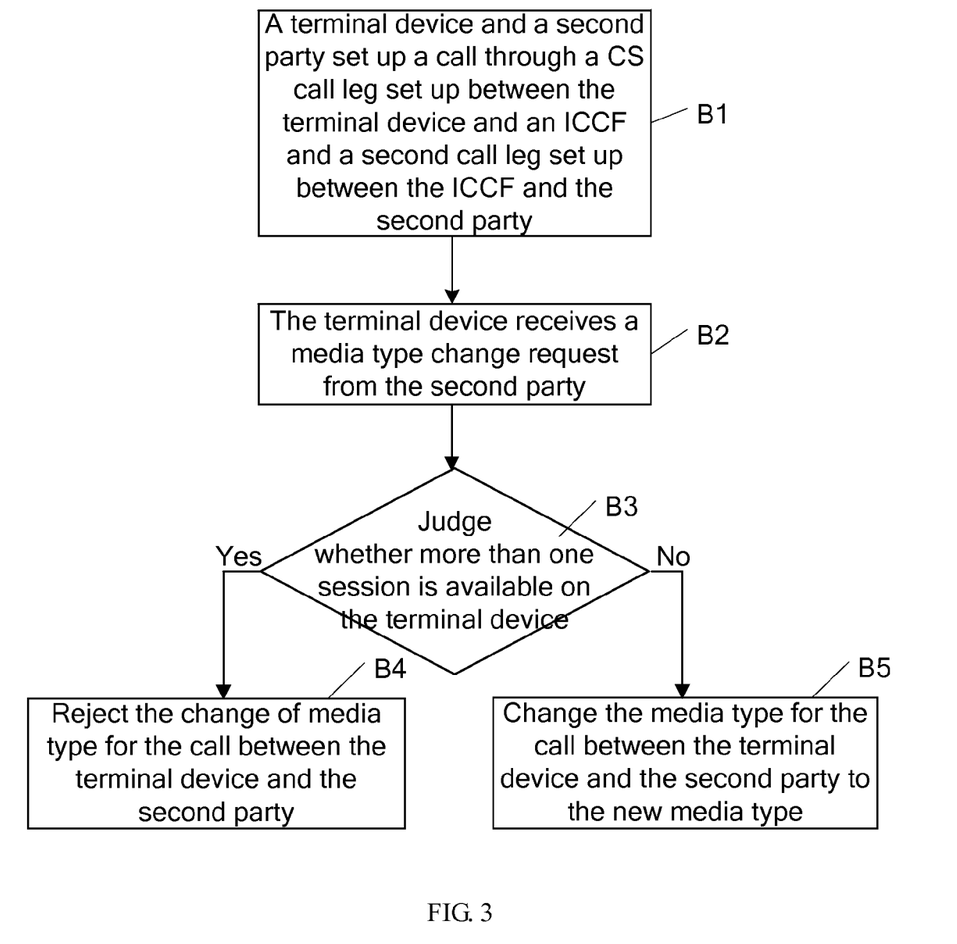
FIG. 3 is a flowchart of a call control method provided in another embodiment of the present invention.

FIG. 3 shows a call control method provided in another embodiment of the present invention. The method includes the following steps:

B1. A terminal device and a second party set up a call through a CS call leg set up between the terminal device and an ICCF and a second call leg set up between the ICCF and the second party.

In this embodiment of the present invention, the terminal device may be a network device that communicates based on CS, for example, a mobile phone, a fixed telephone, a network computer, and a server. The second party includes a peer terminal device that sets up a call with the terminal device, and an access network in which the second party is located. The access network may be a PS or CS access network and is not limited in the present invention.

B2. The terminal device receives a media type change request from the second party.

The process of receiving a media type change request by the terminal device may be as follows:

The second party sends a media type change request to the ICCF, where the media type change request includes a new media type; and the terminal device receives the media type change request forwarded by the ICCF through an ICCC.

It is understandable that the terminal device may also receive the media type change request from the second party through other means, and the specific receiving means are not intended to limit the present invention.

B3. The ICCF judges whether more than one session is available on the terminal device. If so, the process proceeds to B4; otherwise the process skips to B5.

In this embodiment of the present invention, the process of judging whether more than one session is available on the terminal device may be a process of judging whether the ICCF acts as the agent of the terminal device to set up more than one session leg with other parties, where the session refers to communications between the terminal device and a peer party.

B4. The terminal device rejects the change of media type for the call between the terminal device and the second party.

The process of rejecting the change of media type for the call between the terminal device and the second party includes the following steps:

The terminal device returns a reject message to the ICCF through an ICCC to reject the change of media type, and the ICCF forwards the reject message to the second party. It is understandable that the terminal device may also return the reject message to the second party through other channels, and the returned message and channels do not limit the present invention.

B5. The ICCF changes the media type for the call between the terminal device and the second party to the new media type.

The media type for the call between the terminal device and the second party may be changed to the new media type with reference to A5 of the preceding embodiment.

The difference between this embodiment and the preceding embodiment is as follows: In this embodiment, the terminal device in the CS network decides whether to change the media type.

Figure 4:
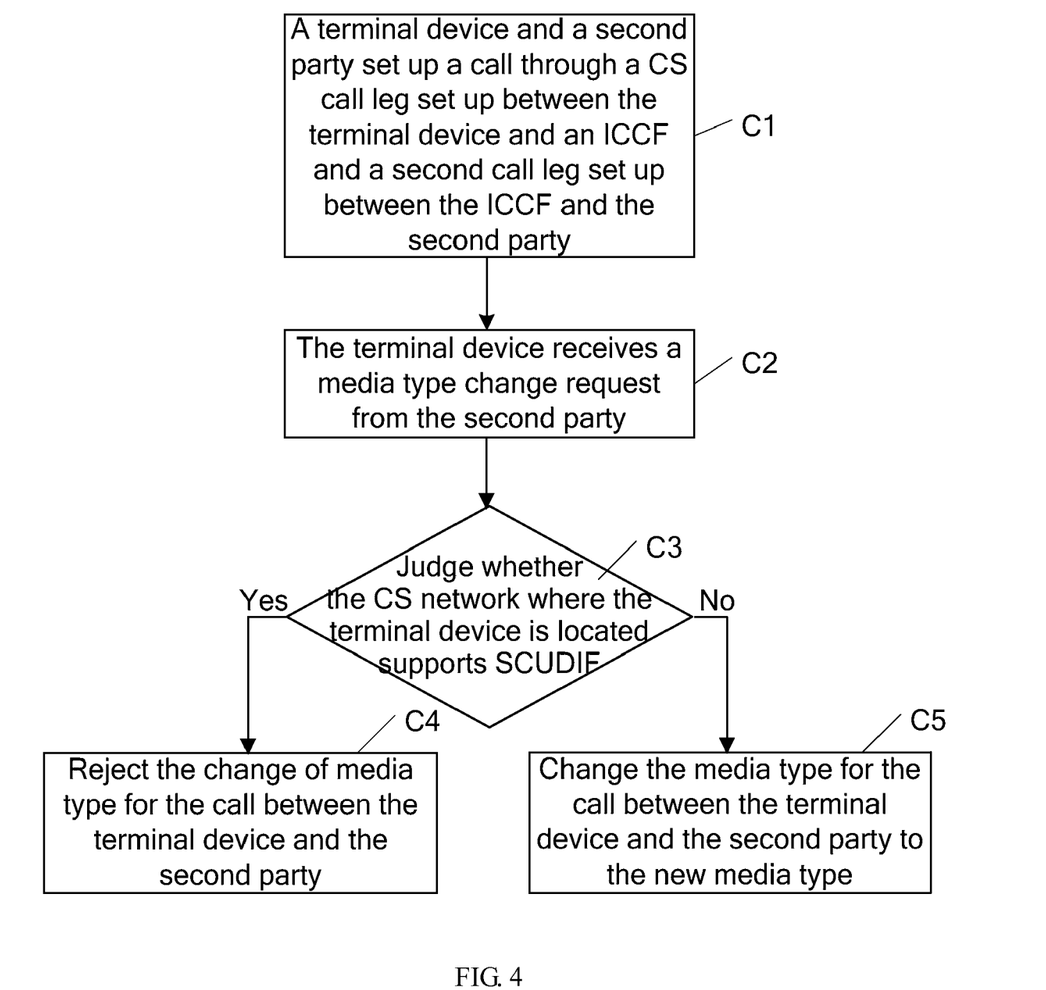
FIG. 4 is a flowchart of a call control method provided in another embodiment of the present invention.

FIG. 4 shows a call control method provided in another embodiment of the present invention. The method includes the following steps:

C1. A terminal device and a second party set up a call through a CS call leg set up between the terminal device and an ICCF and a second call leg set up between the ICCF and the second party.

C2. The ICCF receives a media type change request.

In this embodiment, the media type change request that the ICCF receives is sent by the terminal device through an ICCC, and may include a new media type. The media type change request that the ICCF receives may also be sent by the second party, and include a new media type.

It is understandable that the media type change request may not include a new media type and that a new media type may be obtained through interactions with the terminal device or the second party after a media type change request is received.

C3. The ICCF judges whether a CS network where the terminal device is located supports SCUDIF. If so, the process skips to C5; otherwise the process proceeds to C4.

In this embodiment, the terminal device may know whether the CS network supports SCUDIF through the process of setting up a CS call leg, which may refer to TS 23.172 and TR 29.863 protocols. Then, the terminal device may notify the ICCF through the ICCC. The ICCF may also know whether the CS network supports SCUDIF through a media gateway control function (MGCF). It is understandable that the ICCF may know whether the CS network supports SCUDIF by using multiple means, and the specific means do not limit the present invention.

C4. The ICCF rejects the change of media type for the call between the terminal device and the second party.

The process of rejecting the change of media type for the call between the terminal device and the second party includes the following steps:

The terminal device returns a reject message to the ICCF through an ICCC to reject the change of media type, and the ICCF forwards the reject message to the second party. It is understandable that the terminal device may also return the reject message to the second party through other channels, and the returned message and channels do not limit the present invention.

C5. The ICCF changes the media type for the call between the terminal device and the second party to the new media type.

The media type for the call between the terminal device and the second party may be changed to the new media type with reference to A5 of the preceding embodiment.

In this embodiment, when one party to a call requests media change, the other party rejects the change of media type if the CS network does not support SCUDIF. Compared with a media type conversion scheme in the prior art where an ICCF sends a media conversion request to an MGCF and when the MGCF fails to perform media conversion, the call is disconnected, this embodiment ensures that both parties can continue the call by using the old media type, reduces signalling usage, and optimizes the signalling transmission process.

Figure 5:
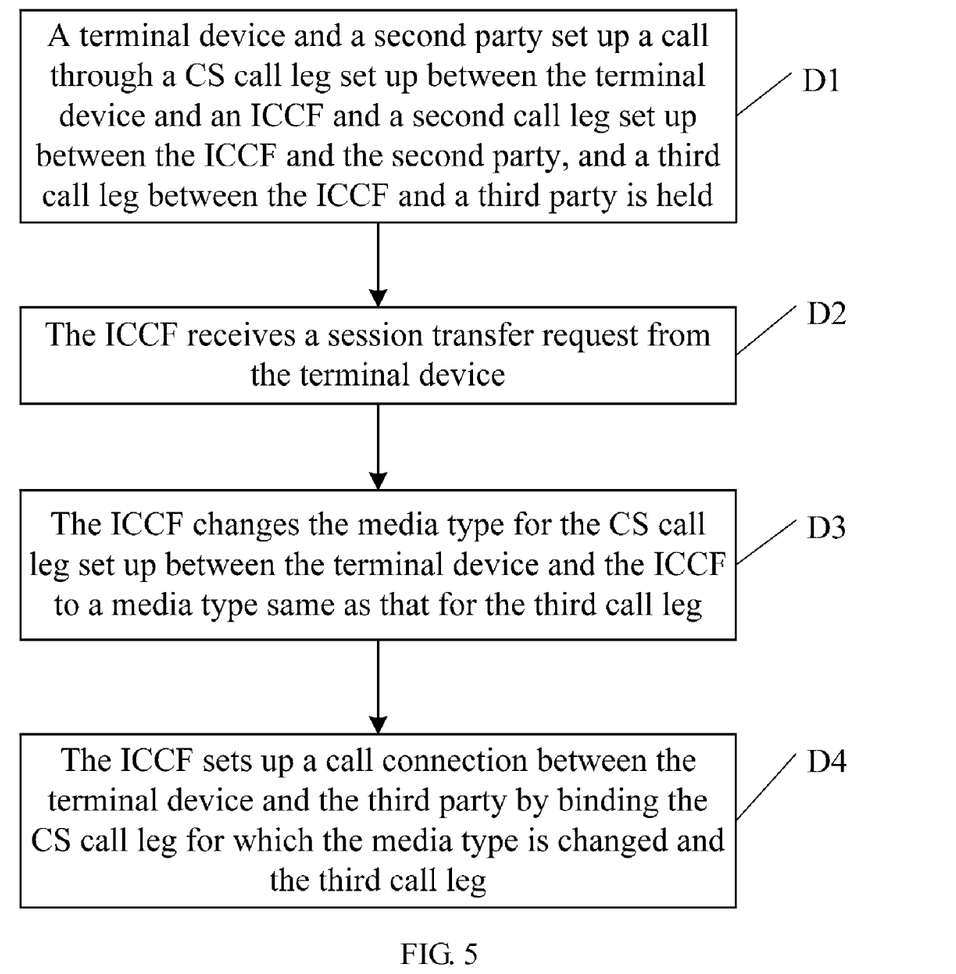
FIG. 5 is a flowchart of a call control method provided in another embodiment of the present invention.

FIG. 5 shows a call control method provided in another embodiment of the present invention. The method includes the following steps:

D1. A terminal device and a second party set up a call through a CS call leg set up between the terminal device and an ICCF and a second call leg set up between the ICCF and the second party, and a third call leg set up between the ICCF and a third party is held.

D2. The ICCF receives a session transfer request from the terminal device.

D3. The ICCF changes the media type for the CS call leg set up between the terminal device and the ICCF to a media type same as that for the third call leg.

In this embodiment, the process of changing the media type for the CS call leg between the terminal device and the ICCF to a media type same as that for the third call leg may be implemented in regular mode in the prior art. However, this requires the CS network devices to support SCUDIF, thus raising high requirements for the CS network devices. It is understandable that this embodiment of the present invention may change the media type for the CS call leg by using the following method:

releasing the CS call leg set up between the terminal device and the ICCF, which is based on the old media type; and setting up a CS call leg between the terminal device and the ICCF based on a media type same as that for the third call leg.

The above method re-sets up a call leg on the CS network. Compared with the method in the prior art, this method lowers the requirements for the CS network, and does not require the CS network to support SCUDIF. As a result, it is unnecessary to upgrade the CS network devices on a large scale, thus reducing network construction costs and enhancing the universality.

It is understandable that the process of releasing and re-setting up a CS call leg may be originated by the ICCF or the terminal device.

D4. The ICCF sets up a call connection between the terminal device and the third party by binding the CS call leg for which the media type is changed and the third call leg.

This embodiment transfers sessions of different media types by changing the media type, and avoids call failure due to inconsistency of media type upon session transfer in the prior art. Further, this embodiment improves the universality of a scheme for session transfer between different media types by re-setting up a CS call leg, and supports the old CS network devices, thus saving service upgrade costs.

Figure 6:
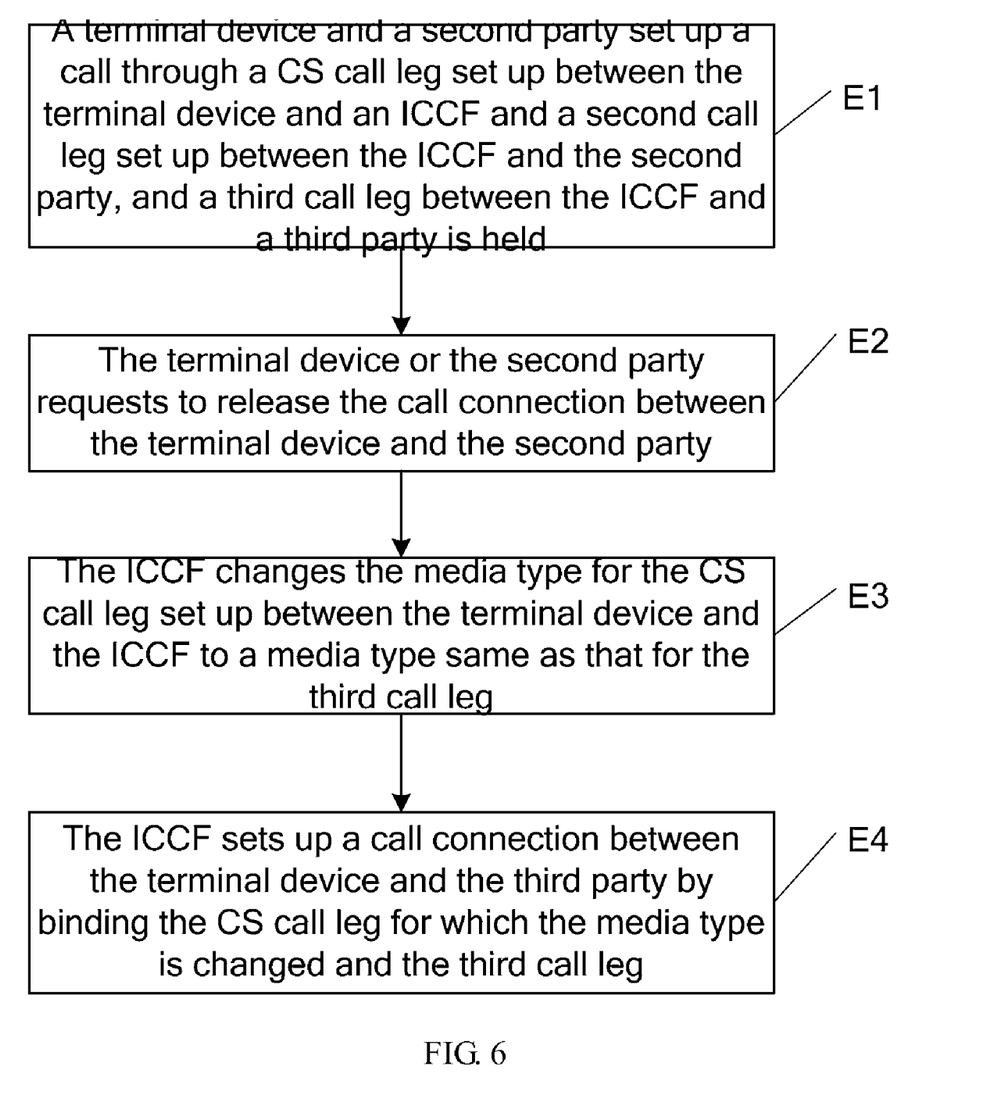
FIG. 6 is a flowchart of a call control method provided in another embodiment of the present invention.

FIG. 6 shows a call control method provided in another embodiment of the present invention. The method includes the following steps:

E1. A terminal device and a second party set up a call through a CS call leg set up between the terminal device and an ICCF and a second call leg set up between the ICCF and the second party, and a third call leg set up between the ICCF and a third party is held.

E2. The terminal device or the second party requests to release the call connection between the terminal device and the second party.

E3. The ICCF changes the media type for the CS call leg set up between the terminal device and the ICCF to a media type same as that for the third call leg.

The process of changing media type is the same as D3 in the preceding embodiment, and is not further described.

E4. The ICCF sets up a call connection between the terminal device and the third party by binding the CS call leg for which the media type is changed and the third call leg.

The difference between this embodiment and the preceding embodiment lies in the condition for triggering the session transfer. In this embodiment, transfer to the session between the terminal device and the third party is triggered when the terminal device or the second party requests to release the call connection between the terminal device and the second party.

Figure 7:
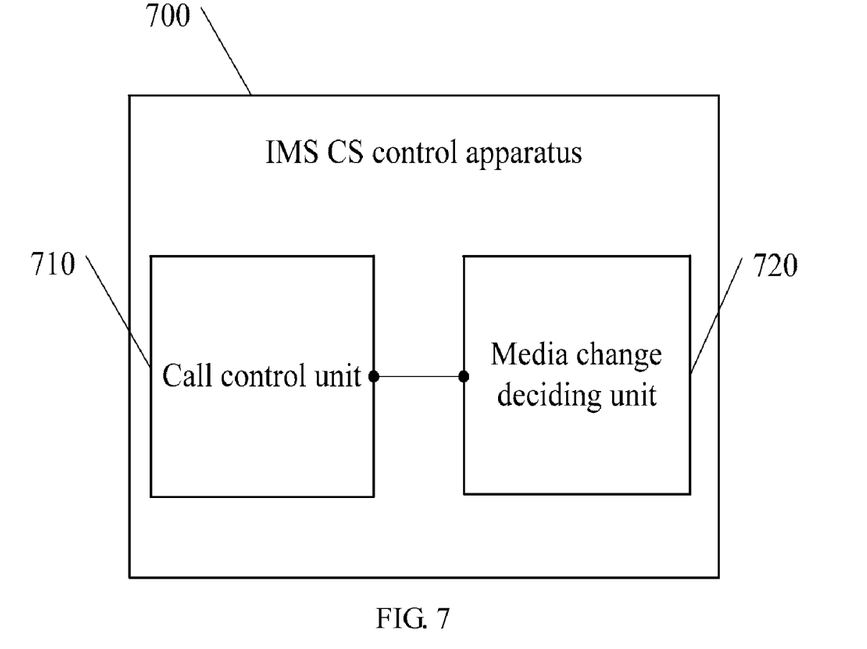
FIG. 7 shows a logical structure of an IMS CS control apparatus provided in another embodiment of the present invention.

FIG. 7 shows a logical structure of an IMS CS control apparatus 700 provided in another embodiment, where the IMS CS control apparatus 700 includes:

a call control unit 710, adapted to control a call between a terminal device and a second party through a CS call leg set up between the apparatus and the terminal device and a second call leg set up between the apparatus and the second party; and a media change deciding unit 720, adapted to: receive a media type change request, judge whether more than one session is available on the terminal device, and reject the change of media type for the call between the terminal device and the second party if more than one session is available on the terminal device.

Figure 8:
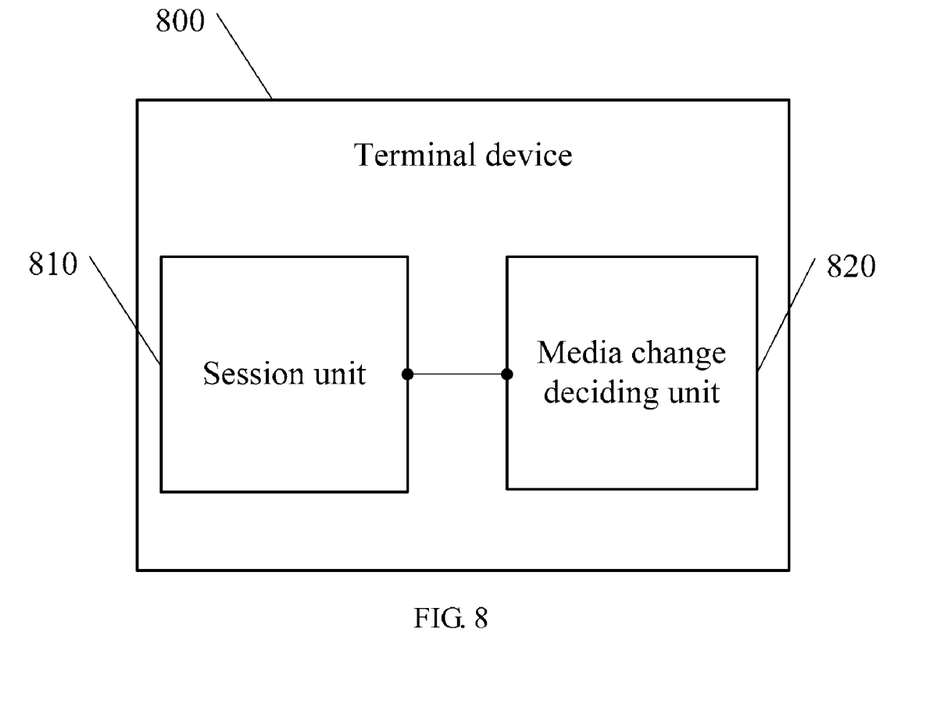
FIG. 8 shows a logical structure of a terminal device provided in another embodiment of the present invention.

FIG. 8 shows a logical structure of a terminal device 800 provided in another embodiment of the present invention, where the terminal device 800 includes:

a session unit 810, adapted to set up a call with a second party through a CS call leg set up between the terminal device and an ICCF and a second call leg set up between the ICCF and the second party; and a media change deciding unit 820, adapted to: receive a media type change request, judge whether more than one session is available on the terminal device, and reject the change of media type for the call between the session unit 810 and the second party if more than one session is available on the terminal device.

Figure 9:
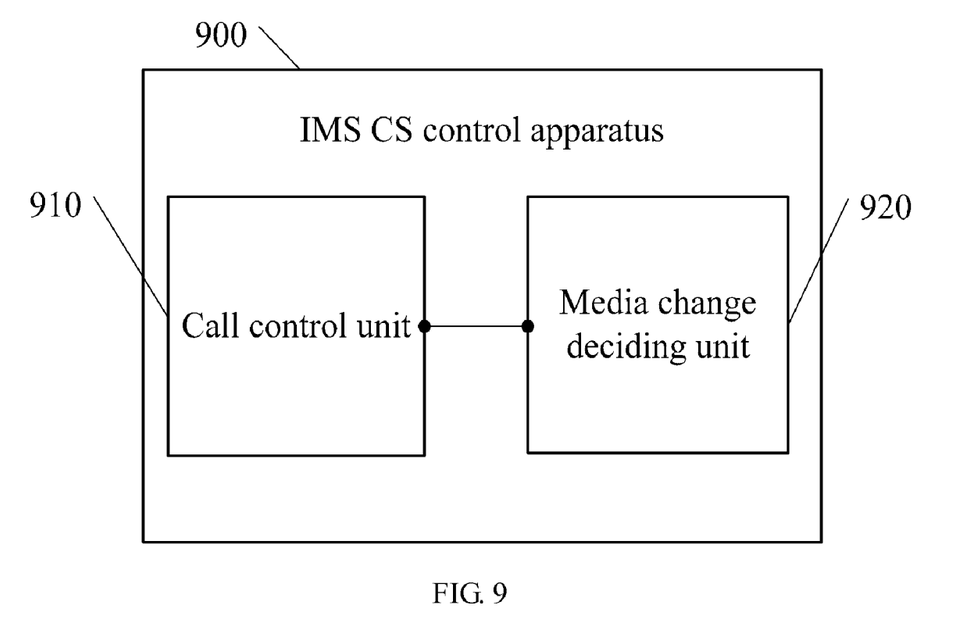
FIG. 9 shows a logical structure of an IMS CS control apparatus provided in another embodiment of the present invention.

FIG. 9 shows a logical structure of an IMS CS control apparatus 900 provided in another embodiment of the present invention, where the IMS CS control apparatus 900 includes:

a call control unit 910, adapted to control a call between a terminal device and a second party through a CS call leg set up between the apparatus and the terminal device and a second call leg set up between the apparatus and the second party; and a media change deciding unit 920, adapted to: receive a media type change request, judge whether a CS network where the terminal device is located supports SCUDIF, and reject the change of media type for the call between the terminal device and the second party if the CS network does not support SCUDIF.

Figure 10:
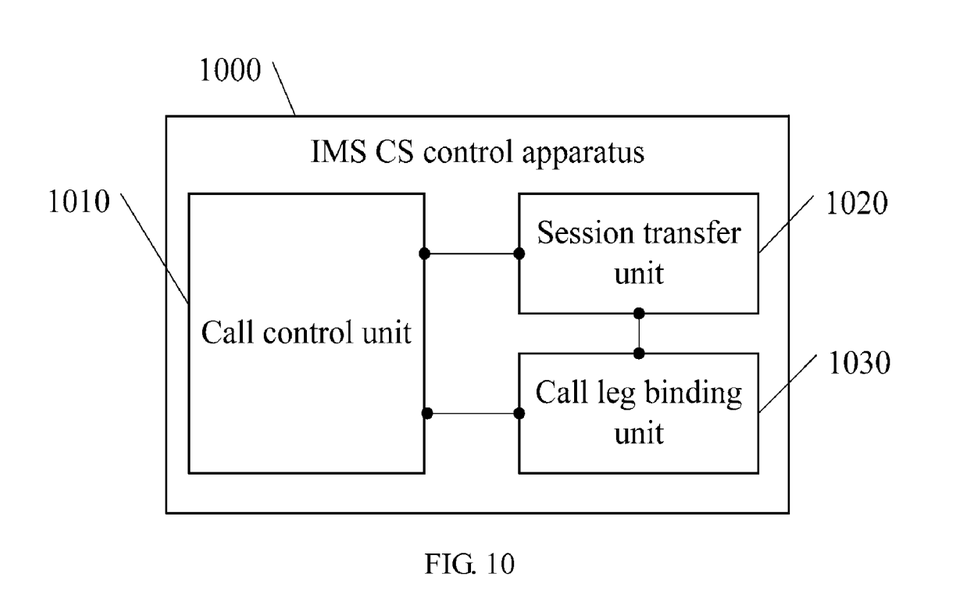
FIG. 10 shows a logical structure of an IMS CS control apparatus provided in another embodiment of the present invention.

FIG. 10 shows a logical structure of an IMS CS control apparatus 1000 provided in another embodiment of the present invention, where the IMS CS control apparatus 1000 includes:

a call control unit 1010, adapted to control a call between a terminal device and a second party through a CS call leg set up between the apparatus and the terminal device and a second call leg set up between the apparatus and the second party; and a session transfer unit 1020, adapted to: receive a session transfer request from the terminal device, change the media type for the CS call leg set up between the apparatus and the terminal device to a media type same as that for the third call leg, and notify a call leg binding unit 1030 of binding the CS call leg for which the media type is changed and the third call leg; and the call leg binding unit 1030, adapted to set up a call connection between the terminal device and a third party by binding the CS call leg for which the media type is changed and the third call leg.

Figure 11:
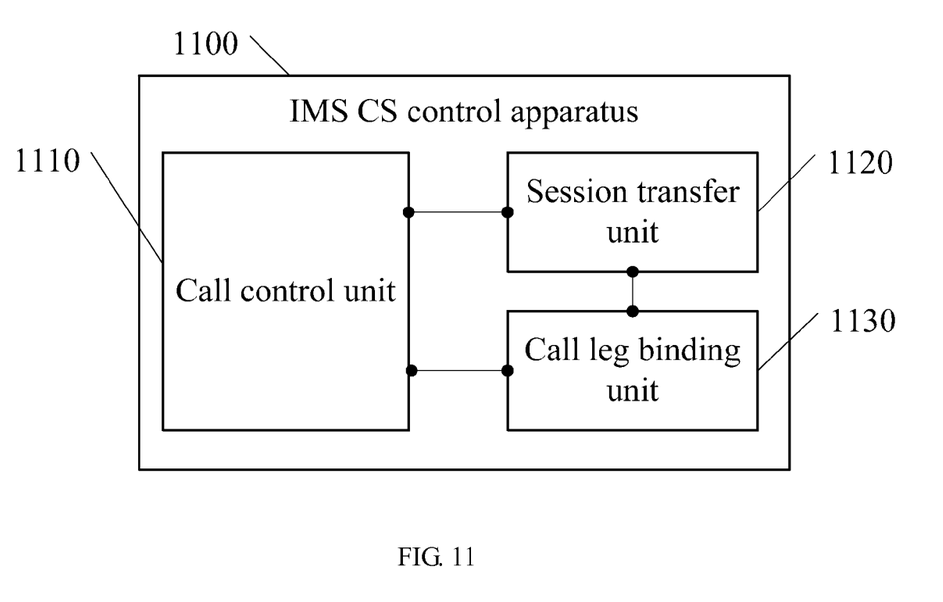
FIG. 11 shows a logical structure of an IMS CS control apparatus provided in another embodiment of the present invention.

FIG. 11 shows a logical structure of an IMS CS control apparatus provided in another embodiment of the present invention, where the IMS CS control apparatus includes:

a call control unit 1110, adapted to control a call between a terminal device and a second party through a CS call leg set up between the apparatus and the terminal device and a second call leg set up between the apparatus and the second party; and a session transfer unit 1120, adapted to: release the call connection between the terminal device and the second party, change the media type for the CS call leg set up between the apparatus and the terminal device to a media type same as that for the third call leg, and notify a call leg binding unit 1130 of binding the CS call leg for which the media type is changed and the third call leg; and the call leg binding unit 1130, adapted to set up a call connection between the terminal device and a third party by binding the CS call leg for which the media type is changed and the third call leg.

What has been described above is a call control method, IMS CS control apparatus and terminal device provided in embodiments of the present invention.

In embodiments of the present invention, a terminal device sets up a call with a second party through a CS call leg set up between the terminal device and an ICCF and a second call leg set up between the ICCF and the second party; the ICCF receives a media type change request, judges whether more than one session is available on the terminal device, and rejects the change of media type for the call between the terminal device and the second party if more than one sessions exists on the terminal device. Embodiments of the present invention avoid the call failure upon session transfer due to the change of media type, thus improving the reliability and stability of session transfer.

In addition, in embodiments of the present invention, when one party to a call requests media change, the other party rejects the change of media type if the CS network does not support SCUDIF. Compared with a media type conversion scheme in the prior art where an ICCF sends a media conversion request to an MGCF and when the MGCF fails to perform media conversion, the call is disconnected, embodiments of the present invention ensure that both parties can continue the call by using the old media type, reduce signalling usage, and optimize the signalling transmission process.

Furthermore, embodiments of the present invention transfer sessions of different media types by changing the media type, and avoid call failure due to inconsistency of media type upon session transfer in the prior art. Further, embodiments of the present invention improve the universality of a scheme for session transfer between different media types by re-setting up a CS call leg, and support the old CS network devices, thus saving service upgrade costs.

It is understandable to those skilled in this art that all or part of steps in the methods of the preceding embodiments may be performed by hardware instructed by a program. The program may be stored in a computer readable storage medium, for example, a read-only memory or a random access memory, a magnetic disk, and a compact disk.

It is apparent that those skilled in the art can make various modifications and variations to the invention without departing from the spirit and scope of the invention. Embodiments of the present invention are not intended to limit the present invention.

What is claimed is:

1. A call control method, comprising:

controlling, by an IP multimedia subsystem (IMS) circuit-switched (CS) control function (ICCF), a call between a terminal device and a second party, wherein the call passes through a CS call leg set up between the ICCF and the terminal device and through a second call leg set up between the ICCF and the second party; and receiving a media type change request that requests changing a media type for the call between the terminal device and the second party using the ICCF, wherein the ICCF rejects the media type change request if more than one session is available on the terminal device, and wherein the media type comprises a voice type, a video type, and a voice-video type.

2. The method of claim 1, wherein the media type change request that the ICCF receives is sent by the terminal device through an IMS CS control channel (ICCC), wherein the media type change request comprises a new media type, and wherein rejecting the request comprises returning, by the ICCF, a reject message to the terminal device to reject the request.

3. The method of claim 2, wherein if only one session is available on the terminal device, the method further comprises changing the media type for the call between the terminal device and the second party to the new media type, wherein the media type indicates the voice type, and wherein the new media type indicates the video type.

4. The method of claim 1, wherein the media type change request that the ICCF receives is sent by the second party and comprises a new media type, and wherein rejecting the request comprises returning, by the ICCF, a reject message to the second party to reject the request.

5. The method of claim 4, wherein if only one session is available on the terminal device, the method further comprises changing the media type for the call between the terminal device and the second party to the new media type.

6. A call control method, comprising:

controlling, by an IP multimedia subsystem (IMS) circuit-switched (CS) control function (ICCF), a call between a terminal device and a second party, wherein the call passes through a CS call leg set up between the ICCF and the terminal device and through a second call leg set up between the ICCF and the second party, and holding, by the ICCF, a third call leg set up between the ICCF and a third party;

receiving, by the ICCF, a session transfer request from the terminal device;

changing, by the ICCF, a media type for the CS call leg to a media type that is the same as the third call leg, wherein the media type indicates a voice media, a video media, and a voice-video media; and setting up, by the ICCF, a call connection between the terminal device and the third party by binding the CS call leg for which the media type is changed and the third call leg.

7. The method of claim 6, wherein the step of changing the media type for the CS call leg between the terminal device and the ICCF to a media type that is the same as the third call leg by the ICCF comprises:

releasing the CS call leg based on an old media type; and setting up a new CS call leg between the terminal device and the ICCF based on a media type that is the same as the third call leg.

8. The method of claim 6, wherein the media type for the CS call leg indicates the voice media, and wherein the media type for the third leg call leg indicates the video media type.

9. An IP multimedia subsystem (IMS) circuit-switched (CS) control apparatus, comprising:

a call control unit; and a media change deciding unit coupled to the call control unit, wherein the call control unit is adapted to control a call between a terminal device and a second party, wherein the call passes through a CS call leg set up between the apparatus and the terminal device and through a second call leg set up between the apparatus and the second party, and wherein the media change deciding unit is adapted to:

receive a media type change request to change a media type for the call between the terminal device and the second party, wherein the media type comprises a voice type, a video type, and a file type; and reject the request if more than one session is available on the terminal device.

10. The IMS CS control apparatus of claim 9, wherein a media type change request changes the media type for the call from a voice type to a file type.

11. An IP multimedia subsystem (IMS) circuit-switched (CS) control apparatus comprising:

a session transfer unit;

a call leg binding unit coupled to the session transfer unit; and a call control unit coupled to the session transfer unit and the call leg binding unit, wherein the call control unit is adapted to control a call between a terminal device and a second party, wherein the call passes through a CS call leg set up between the apparatus and the terminal device and through a second call leg set up between the apparatus and the second party, and hold a third call leg set up between the apparatus and a third party;

wherein the session transfer unit is adapted to:

receive a session transfer request from the terminal device;

change a media type for the CS call leg to a media type same as that for the third call leg, wherein the media type indicates a voice type, a video type, and a file type; and notify the call leg binding unit of the change, and wherein the call leg binding unit is adapted to set up a call connection between the terminal device and the third party by binding the CS call leg for which the media type is changed and the third call leg.

12. The IMS CS control apparatus of claim 11, wherein the media type for the CS call leg indicates the voice type, and wherein the media type for the third leg call leg indicates the file type.

* * * * *